Oct. 24, 1967
R. H. REHDER ETAL
3,349,168
NON-SEGREGATED METAL CLAD BUS DUCT WITH INSULATING
FRAMES FOR SUPPORTING BUS BARS
Filed Nov. 16, 1965
2 Sheets-Sheet 1
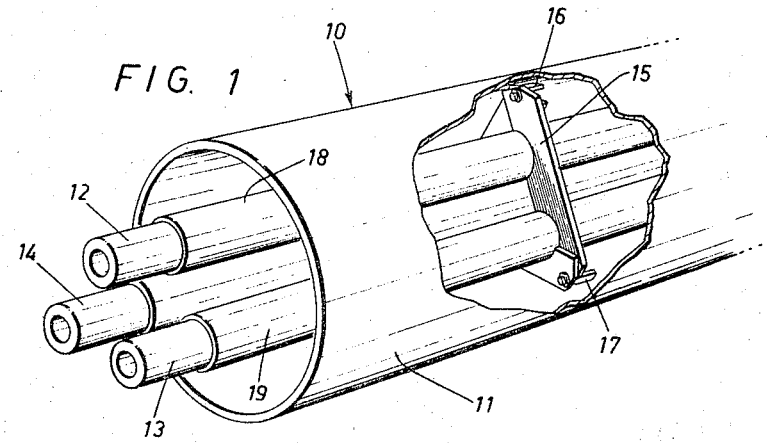
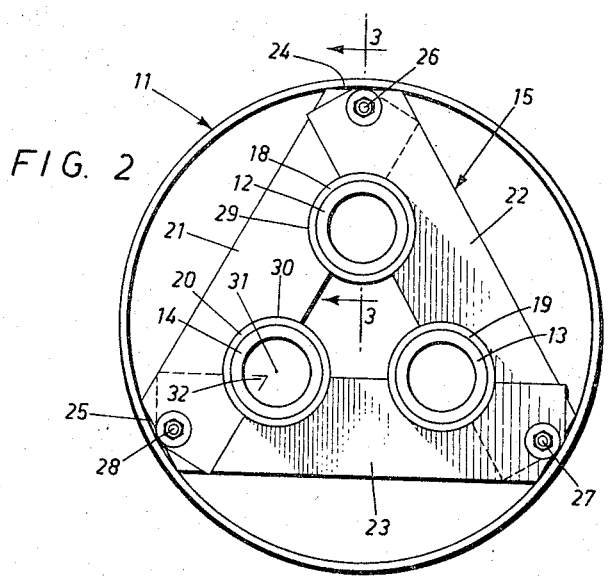
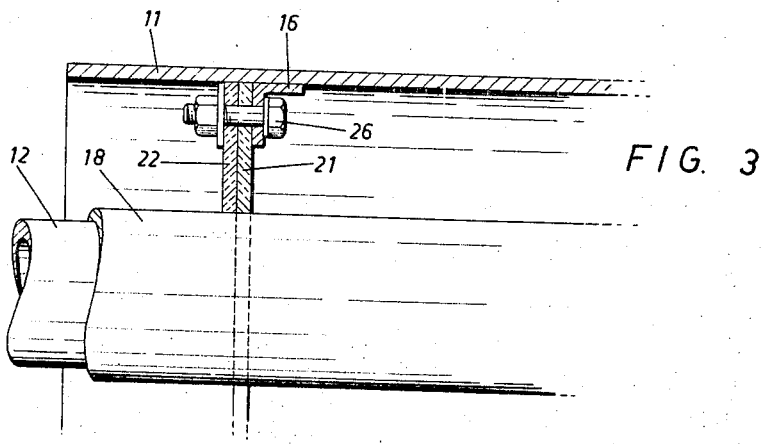

Oct. 24, 1967          R. H. REHDER ETAL          3,349,168
       NON-SEGREGATED METAL CLAD BUS DUCT WITH INSULATING
Filed Nov. 16, 1965        FRAMES FOR SUPPORTING BUS BARS
                                                2 Sheets-Sheet 2

United States Patent Office 3,349,168
Patented Oct. 24, 1967

3,349,168
NON-SEGREGATED METAL CLAD BUS DUCT WITH INSULATING FRAMES FOR SUPPORTING BUS BARS
Robert H. Rehder, Peterborough, Ontario, Canada, and Nathan Swerdlow, Philadelphia, Pa., assignors to General Electric Company, a corporation of New York
Filed Nov. 16, 1965, Ser. No. 508,078
6 Claims. (Cl. 174—99)

ABSTRACT OF THE DISCLOSURE

Three circular bus bars are supported inside a circular bus duct by a number of triangular frames located inside the duct at spaced intervals transverse to the duct. Each frame comprises three rigid insulating members secured together at the outer corners of the frame. Each of the inner corners of the frame is notched to form an opening of more than half a circle in which one of the circular bus bars is held.

---

This invention relates to metal clad bus duct of the kind where the bus bars used to transmit electric energy are isolated in a single metallic duct. The invention is concerned specifically with structure for supporting the bus bars inside the duct.

The use of a number of bus bars enclosed in a single metallic duct is well known for transmitting high multiphase currents relatively short distances at moderately high voltages. In this system the bus bars are supported inside the duct in spaced relation to one another and to the walls of the duct by means of insulating structures located inside the duct at spaced intervals. These structures may be pedestal type insulators, clamping devices, or some other kind of structure designed to fit inside the duct and hold the bus bars in place. Although these systems are considered to be satisfactory, they are also considered to be relatively expensive because of the number and the complexity of the parts, and the means employed for mounting them in the duct and fastening them to the bus bars.

Therefore, the object of this invention is to provide a simple, relatively inexpensive means for supporting a number of bus bars inside a duct.

According to a preferred embodiment of the invention for use in a three phase system, three circular bus bars are supported inside a circular bus duct by means of a number of triangular frames located inside the duct at spaced intervals transverse to the duct. Each frame is made from three rigid insulating members secured together at the outer corners of the frame, and each one of the three inner corners of the frame contains a semi circular notch formed in the two adjoining members. The bus bars fit into these notches so as to be supported by the frame. Some of the frames are secured to the duct and some are not.

In order that the invention may be more readily understood the description will now refer to the accompanying drawings in which:

FIGURE 1 is a perspective view of a three phase bus duct assembly showing one of the novel frames used to support the three bus bars inside the duct;

FIGURE 2 is an end view of the assembly shown in FIGURE 1;

FIGURE 3 is a cross section taken along 3—3 of FIGURE 2;

Figure 4:
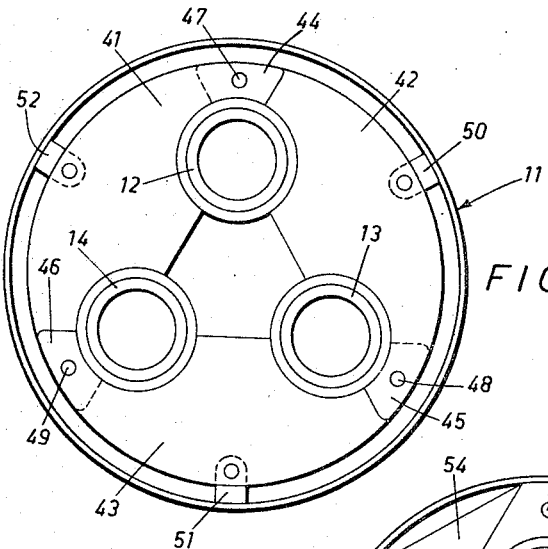
FIGURES 4, 5 and 6 are end views similar to FIGURE 2 showing other embodiments of the invention.

FIGURE 1 shows a metal clad bus bar assembly 10 consisting of a circular metal duct 11 having three rigid, tubular conductors (i.e., bus bars) 12, 13 and 14, also of circular cross section, supported therein by means of a number of frames 15, of which only one is shown. Frames 15 are located at spaced intervals along the length of the duct transverse thereto and space the conductors equally from one another and from the duct. All of the frames are secured to the conductors and some are secured to the duct as well. In the embodiment of the invention illustrated in FIGURES 1, 2 and 3, the frame at each end of a duct section is secured to the duct and the intermediate frames are not necessarily secured to the duct, that is, they rest freely inside the duct. Where a frame is secured to the duct, it is through the medium to three lugs which project inwardly from the wall of the duct, two of which are shown at 16 and 17 in FIGURE 1. These lugs hold the frames in place and transmit forces to the duct due to the weight of the conductors where the run is other than horizontal. Each complete run will include a number of sections joined end-to-end. The way in which the conductors and the ducts are joined is immaterial to the invention and will not be described. It will be noted from FIGURES 1, 2 and 3 that the conductors are covered by insulating sleeves 18, 19 and 20 and that the frames are clamped over the sleeves. When insulating sleeves are used, the clearances between the conductors and between the conductors and the duct need not be as great as they would otherwise be with bare conductors.

FIGURE 2 shows one of the two or more frames 15 used to support the conductors in duct 11. Each frame 15 consists of three identical bars 21, 22 and 23 arranged in a geometrically closed configuration, e.g., in an equilateral triangle, with the ends overlapped at the corners of the triangle and shaped so the frame fits freely into the duct with end portions of each bar butting against the wall of the duct as illustrated at 24, 25 in connection with bar 21. Each bar is a rigid, elongated member of rectangular cross section, and it is made of insulating materials such as a polyester resin reinforced with glass fibers. The relatively broad, flat sides of the bars are transverse to the duct and overlapped at the ends where the bars are fastened together by means of bolts 26, 27 and 28, the same bolts that may also be used to fasten the frame to the lugs as best illustrated in FIGURE 3. Either holes or slots may be formed in the sides of the bars near their ends for the bolts. By locating all the bolts at the very ends of the bars, it is possible to make all the frames alike, whether secured or free inside the duct, and use the same bolts that normally fasten the bars together to secure the frames to the duct.

The means employed to hold the conductors in place consists of a cutout in each inside corner of the frame; the cutout has an enlarged mid section so that considerably more than half the conductor is surrounded by frame structure. For a circular conductor such as that illustrated, this cutout is a partial circle greater than a semicircle and less than a full circle; it is actually two separate cutouts, one in each of the two juxtaposed bars. These two cutouts are the same size and are aligned axially; they have a common center and the same radii; and each is a little less than a semicircle. Numerals 29 and 30 denote the cutouts in bar 21. The two cutouts in each bar are identical, symmetrically placed in the bar, and a little less than a semicircle having its center located a litte inside the corner of the triangle defined by the inner edges of the frame as illustrated at 31, 32 for cutout 30. The three bars 21, 22 and 23 are identical and therefore interchangeable in the frame. By making the individual cutouts a little less than a semicircle, the pieces are readily assembled to the conductors as a frame and attached to the duct where necessary.

It will be noted from FIGURE 2 that each conductor is held in place by means of two juxtaposed frame sides surrounding the major portion of the conductor. It will be noted also that the ends of each bar butting against the wall of the duct are formed by removing the outer corners from the bar as at 24 and 25 of bar 21. This places a substantial end portion of each bar against the wall of the duct, making the structure strong enough to resist the major forces exerted outwardly on the frame by the conductors during short circuit conditions.

In the embodiment of the invention illustrated in FIGURES 1 to 3, the presence of the lugs to which some frames are secured tend to reduce the clearances between the conductors and the duct. Hence the maximum voltage on the conductors will be determined by the clearances between the conductors and the lugs rather than by the clearances between the conductors and the wall of the duct. FIGURE 4 illustrates a way in which these clearances can be increased without enlarging the duct. In the FIGURE 4 embodiment of the invention, at least those frames bolted to the lugs have the mid portion of each side extended radially outward so the lugs can now be located intermediate the conductors where the clearances are the greatest rather than in the spaces where the clearances are the smallest.

In the FIGURE 4 construction, the frame consists of three segmental members 41, 42 and 43 rather than the three bars 21, 22 and 23. The means employed to hold the conductors in place is the same, but the structure differs in that the sides of the frame are extended radially outward so that an intermediate portion of each is now near the wall of the duct. As in the first embodiment, the flat sides of members 41, 42 and 43 are transverse to the duct, and the ends of the members are overlapped at 44, 45, 46 and bolted together at 47, 48 and 49. The lugs 50, 51 and 52 used for securing the frame to the duct are now located midway of the members as clearly shown in FIGURE 4 in the spaces most remote from the conductors. This in effect increases the clearances between the conductors and the duct, allowing higher voltages on the conductors. In order to operate at the highest possible conductor voltages, members 41, 42 and 43 may be made of porcelain moulded in the segmental shapes illustrated. As it is difficult to make porcelain parts to close tolerances, the frame can be somewhat smaller than the duct, leaving an annular clearance space 53 between the outer edge of the frame and the inner surface of the wall.

Figure 5:
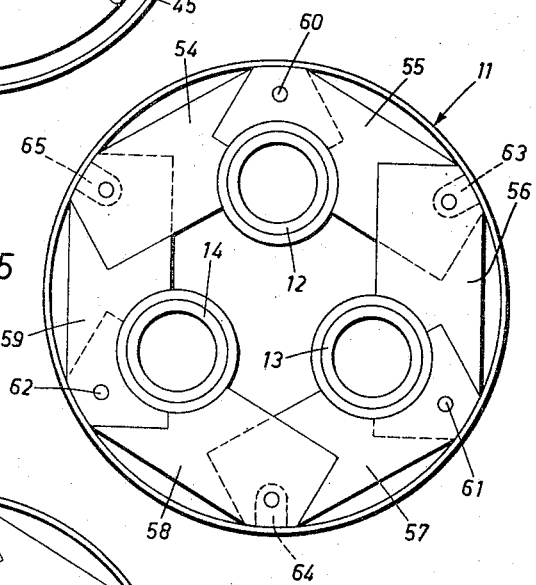

FIGURE 5 illustrates another arrangement of three conductors where the lugs for securing the frame to the duct are located at the farthest points from the conductors. In this construction, six identical bars 54 to 59 of insulating material are arranged in a hexagon with every other pair of juxtaposed bars bolted together at 60, 61 and 62 and the remaining pairs bolted together and to the lugs 63, 64 and 65. The cutouts for holding conductors 12, 13 and 14 in place are made in the inside corners of the frame opposite bolts 60, 61 and 62. This construction is essentially the same as that shown in FIGURE 2 except that it has six sides while the latter only three. It will be noted that the hexagonal frame does not grip as much of the conductors as does the triangular frame.

Figure 6:
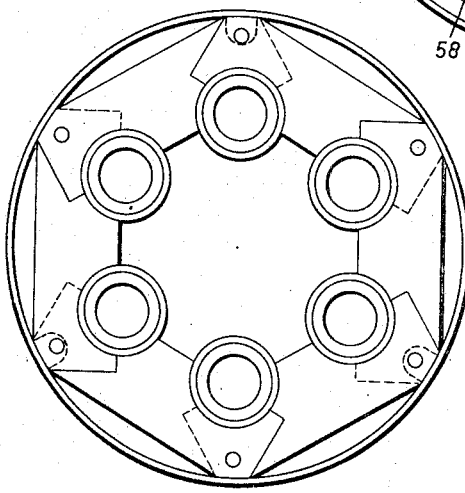

FIGURE 6 illustrates how the hexagonal frame of FIGURE 5 can be adapted to support up to six conductors. Six conductors can be supported by having a conductor retaining cutout in every inside corner of the frame. Otherwise the two frames are exactly the same. However, the extra clearances provided in the FIGURE 5 structure cannot be realized in the FIGURE 6 structure.

FIGURES 1 to 5 are directed to a three phase metal clad bus bar assembly wherein three circular conductors are symmetrically placed inside a circular duct so as to provide a balanced system, and FIGURE 6 is directed to a similarly balanced six phase system. Frames of this simple construction are relatively inexpensive to manufacture, easy to assemble, and possess good electrical and mechanical characteristics. As a result, practice of the invention offers economies and a balanced system.

While particular embodiments of the invention have been shown and described, it will be obvious to those skilled in the art that various changes and modifications may be made without departing from the invention in its broader aspects; it is, therefore, intended in the appended claims to cover all changes and modifications falling within the true spirit and scope of the invention.

What we claim as new and desire to secure by Letters Patent of the United States is:

1. In an enclosed bus bar assembly having a metal duct and a plurality of circular bus bars located inside the duct lengthwise thereof in spaced relation to each other and to the duct, means supporting said bus bars in said spaced relation comprising a plurality of multisided frames of closed configuration located at spaced intervals inside said duct transverse thereto, means securing at least some of said frames to the duct, each one of said frames comprising a plurality of rigid members made of insulating materials and having relatively broad and flat sides transverse to the duct and relatively narrow inner and outer edges, a pair of substantially semicircular notches in the inner edges of each member near its ends, means securing the ends of said members together in said frame with a flat side of one member engaging a flat side of an adjacent member and with the notches in the engaging members registering along only a portion of their periphery so as to define an opening of more than half a circle through the frame at each of its inside corners, each of said openings holding a circular bus-bar for support by the frame.

2. In an enclosed bus bar assembly having a circular metal duct and three circular bus bars located inside the duct lengthwise thereof in spaced relation to each other and to the duct, means supporting said bus bars in said spaced relation comprising a plurality of three sided frames located at spaced intervals inside said duct transverse thereto, means securing at least some of said frames to the duct, each one of said frames comprising three rigid members made of insulating materials and having relatively broad and flat sides transverse to the duct and relatively narrow inner and outer edges, a pair of semicircular cutouts in the inner edge of each member near its ends, means securing the ends of said members together in a triangular frame with a flat side of one member engaging a flat side of an adjacent member and with the cutouts in the engaging members registering so as to define an opening at the inside corner of more than half a circle, each one of said openings holding a bus bar for support thereof by the frame.

3. The assembly defined in claim 2 wherein said triangular frame is three identical board-like members formed with the bus bar cut outs and bolted together at the outer corners of the triangular configuration, and the means for securing a frame to the duct are the three bolts in the frame also securing the corners of the frame to three lugs inside the duct.

4. The assembly defined in claim 2 wherein said frame is three identical board-like members formed with bus bus bar cut outs and bolted together at their ends, and the means for securing a frame to the duct is a lug inside the duct bolted to each member intermediate its length.

5. In an enclosed bus bar assembly having a circular metal duct and three circular bus bars located inside the duct lengthwise thereof in spaced relation to each other and to the duct, means supporting said bus bars in said spaced relation comprising a plurality of frames located at spaced intervals inside said duct transverse thereto as a clearance fit, each one of said frames having a circular outer contour and a triangular inner contour and comprising three rigid members made of insulating materials and having relatively broad and flat sides transverse to the duct, a relatively narrow and straight inner edge, and a relatively narrow and arcuate outer edge, a pair of semicircular cutouts in the inner edge of each member near its ends, means securing the ends of said members together in a triangular frame with a flat side of one member engaging a flat side of an adjacent member and with the cutouts in the engaging members registering so as to define an opening at the inside corner of more than half a circle, each one of said openings holding a bus bar for support thereof by the frame, and means securing at least some of said frames to said duct at points on the members intermediate the length thereof and adjacent said arcuate outer edges.

6. The bus bar assembly of claim 1 in which the means for securing said frames to said duct are located at points on said insulating members intermediate the length thereof, angularly spaced from said bus bars, and adjacent the outer periphery of a frame; said frames being spaced from said duct or any metallic structure connected to said duct in the regions angularly aligned with said bus bars.

References Cited

UNITED STATES PATENTS

| | | | |
|---|---|---|---|
| 315,526 | 4/1885 | Macquarrie | 174—99 X |
| 469,723 | 3/1892 | Robbins | 174—99 X |
| 3,121,772 | 2/1964 | Zurwelle | 174—99 |

OTHER REFERENCES

Geyer, German application No. 1,042,070, printed Oct. 30, 1958.

LARAMIE E. ASKIN, *Primary Examiner.*